(12) United States Patent
Chuang et al.

(10) Patent No.: US 8,391,618 B1
(45) Date of Patent: Mar. 5, 2013

(54) SEMANTIC IMAGE CLASSIFICATION AND SEARCH

(75) Inventors: Jason C. Chuang, Stanford, CA (US); Holger Winnemoeller, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1098 days.

(21) Appl. No.: 12/324,328

(22) Filed: Nov. 26, 2008

Related U.S. Application Data

(60) Provisional application No. 61/098,593, filed on Sep. 19, 2008.

(51) Int. Cl.
G06K 9/62 (2006.01)
(52) U.S. Cl. .................................................. 382/224
(58) Field of Classification Search .............. 382/224, 382/305, 306; 707/739
See application file for complete search history.

(56) References Cited

U.S. PATENT DOCUMENTS

| | | | |
|---|---|---|---|
| 6,892,193 B2 | 5/2005 | Bolle et al. | |
| 6,977,679 B2 * | 12/2005 | Tretter et al. | 348/231.2 |
| 6,993,535 B2 | 1/2006 | Bolle et al. | |
| 7,035,467 B2 * | 4/2006 | Nicponski | 382/224 |
| 7,099,860 B1 | 8/2006 | Liu et al. | |
| 7,111,002 B2 | 9/2006 | Zhang et al. | |
| 7,349,895 B2 | 3/2008 | Liu et al. | |
| 2007/0288408 A1 * | 12/2007 | Li et al. | 706/19 |
| 2009/0299999 A1 * | 12/2009 | Loui et al. | 707/5 |
| 2009/0310854 A1 * | 12/2009 | Mei et al. | 382/159 |
| 2011/0085739 A1 * | 4/2011 | Zhang et al. | 382/218 |

OTHER PUBLICATIONS

Yang et al. "Semantic Home Photo Categorization." IEEE Transactions on Circuits and Systems for Video Technology, vol. 17, No. 3, Mar. 2007, pp. 324-335.*
Lim et al. "Cascading Classifiers for Consumer Image Indexing." Proceedings of the 17th International Conference on Pattern Recognition, vol. 4, Aug. 23, 2004, pp. 897-900.*
Michael S. Lew, et al., "Content-based Multimedia Information Retrieval: Stat of the Art and Challenges," in ACM Transactions on Multimedia Computing, Communications, and Applications, Feb. 2006, 26 pages.

* cited by examiner

*Primary Examiner* — Jon Chang
(74) *Attorney, Agent, or Firm* — Wolfe-SBMC

(57) ABSTRACT

A method, system, and computer-readable storage medium for categorizing digital images. A plurality of semantic category scores for a digital image are determined via application of a corresponding plurality of classifiers. A semantic category profile for the image is automatically determined based on the plurality of semantic category scores, where the semantic category profile characterizes semantic content of the image, and is useable to perform semantic based operations with respect to the image.

35 Claims, 8 Drawing Sheets

SEMANTIC IMAGE CLASSIFICATION AND SEARCH

PRIORITY DATA

This application claims benefit of priority to U.S. Provisional Application Ser. No. 61/098,593 titled "Semantic Image Classification and Search", filed Sep. 19, 2008, whose inventors are Jason Chuang and Holger Winnemoeller, and which is hereby incorporated by reference in its entirety.

BACKGROUND

1. Field of the Invention

The present invention is directed generally to digital image categorization, and more particularly to automatic classification of digital images and enabling semantic image searching on digital image collections.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Image Retrieval, Annotation, and Semantic Search

Image retrieval is the task of locating a specific image from a digital image (e.g., digital photograph, digital art, etc.) collection. A basic image retrieval method is to display a tiling of thumbnails on the screen which a user can scroll through, visually examine each thumbnail, and locate the target image.

Image annotation is the task of assigning keywords, captions, location, and/or other metadata to a photograph to add/associate semantic content to/with the image.

Semantic image search is a specific type of image retrieval in which a user searches for an image through semantically meaningful queries or interfaces. Two common semantic image search methods are search by keywords and faceted search. If images in a photo collection have been annotated with keywords, a user can retrieve an image by specifying any of these keywords, or related keywords (such as synonyms or other semantically related words), and, and the system then retrieves all images containing any or all of the keywords. A system can also provide a faceted search interface that allows the user to filter the set of images along meaningful dimensions, such as location (e.g. "taken in Seattle, Wash."), time (e.g. "taken between years 2006 and 2008"), people (e.g. "contains at least three people"), etc.

In image retrieval, a desirable quality is the ability to locate a target image as quickly or easily as possible. Suppose a user wants to locate an image from a collection of n photos. By visually inspecting the photos one at a time, the user reduces the number of candidates from n to n−1 after one inspection and takes on average n/2 inspections to locate the image. Whereas by using a facet search interface, a user may be able to filter out half of the candidates with each successive query, reduce the number of candidates from n to n/2, and locate the image after log 2(n) queries. The latter approach is generally considered more desirable as it allows a user to retrieve the target image faster and with less effort.

Automatic Semantic Classifiers

As used herein, automatic semantic classifiers are defined as machine learning algorithms or programs that take an image as input and produce a score on how well the image matches a predefined scene, such as "waterscape", "landscape", "urban", "beach", etc. Almost all current, i.e., prior art, semantic classifiers preprocess the content of the image and produce visual features instead of learning on raw pixel values. Two common low level visual features are colors and textures. More recent approaches construct hierarchical visual features or combine colors and textures into feature themes, and classify on these secondary features instead of the original low level features. Some approaches use the metadata (e.g., camera EXIF) as input to the classifier as well.

Almost all automatic semantic classifiers learn by example. For each semantic category, a set of photographs matching the scene are manually selected and used as positive training examples. A second set of photographs (e.g., randomly or manually selected) are used as negative examples. A supervised learning algorithm is trained to separate the positive and negative examples based on the differences in the input visual features and/or input metadata.

SUMMARY

Various embodiments of systems, methods, and computer-readable storage media for analyzing and categorizing digital images are presented.

A plurality of semantic category scores for an image may be determined via application of a corresponding plurality of classifiers. The plurality of classifiers may be separate programs or processes, or may be implemented as a single (or several) generic classifier with sub-processes or sub-programs implementing the respective functionality of the plurality of classifiers. In other words, in some embodiments, the plurality of classifiers compose at least one generic classifier that includes a plurality of sub-programs respectively implementing at least a subset of the plurality of classifiers. For example, one generic classifier may implement all of the plurality of classifiers, or multiple generic classifiers may each implement a respective subset of the plurality of classifiers, thereby implementing the plurality of classifiers. Said another way, in various embodiments, the respective functionality of the plurality of classifiers may be distributed in any of various ways, e.g., being implemented as a single generic classifier (with sub-programs implementing respective specific classifiers), being implemented as several generic classifiers, each implementing the functionality of a subset of the specific classifiers, or being implemented as a corresponding plurality of programs, each directed to a specific classifier, or any combination of the above. Note further that in various embodiments, the application of the plurality of classifiers may be performed serially, concurrently, or a mixture of both, e.g., on a single computing device, or via multiple devices, possibly operating in conjunction, e.g., over or via a network.

Each classifier is associated with a respective semantic category, and may operate to analyze the image (e.g., image data and/or image meta-data, such as EXIF data) and determine a score for the image with respect to that semantic category. For example, in some embodiments, the score may range from zero to 1, where zero denotes no or minimum applicability of the semantic category to the image, and 1 denotes full or maximum applicability of the semantic category to the image, although any other scoring scheme may be used as desired.

A semantic category profile for the image may be automatically determined based on the plurality of semantic category scores, where the semantic category profile characterizes semantic content of the image, and is useable to perform semantic based operations with respect to the image, e.g., semantic image searches, keyword determination or identification, image characterization, and so forth. In one embodiment, the semantic category profile comprises the semantic category scores.

In some embodiments, the above method elements may be performed for each image in a collection of images, thus facilitating subsequent semantic content-based operations with respect to the collection, e.g., semantic image searches, classifier evaluations, etc.

Thus, various embodiments of the systems and methods disclosed herein may facilitate semantic digital image categorization for use in semantic based digital image operations.

Figure 1:
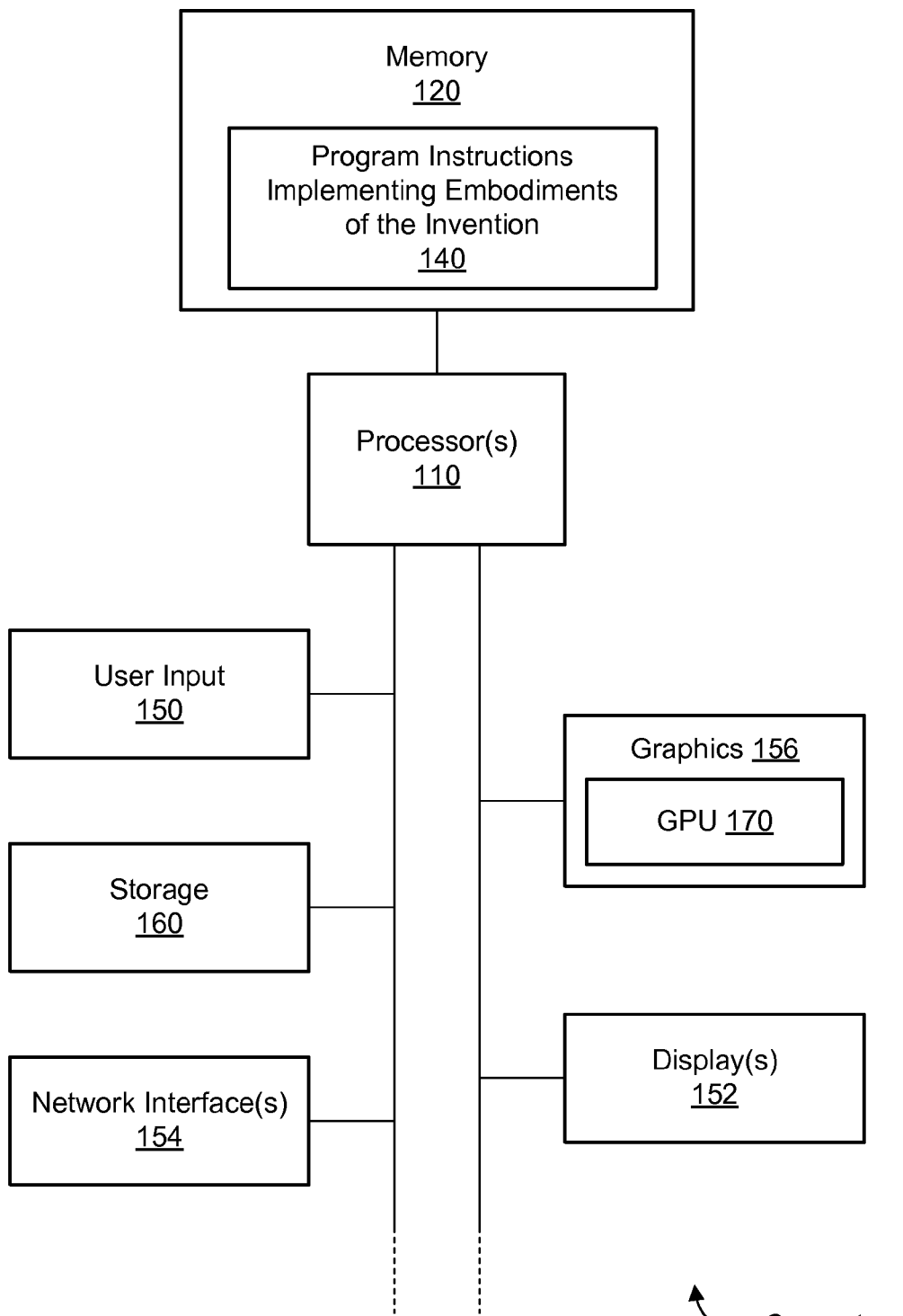
FIG. 1 is a block diagram of an exemplary system configured to implement embodiments of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to automatically annotate digital images, e.g., digital photographs, digital art, scans of artwork, etc., and enable semantic image search on digital image collections. Examples of applications for such annotation and enablement include, but are not limited to, management of personal photograph collections and image classification, as well as scene or image decomposition and analysis, e.g., for scientific or security applications, e.g., monitoring, surveillance, etc., among others.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
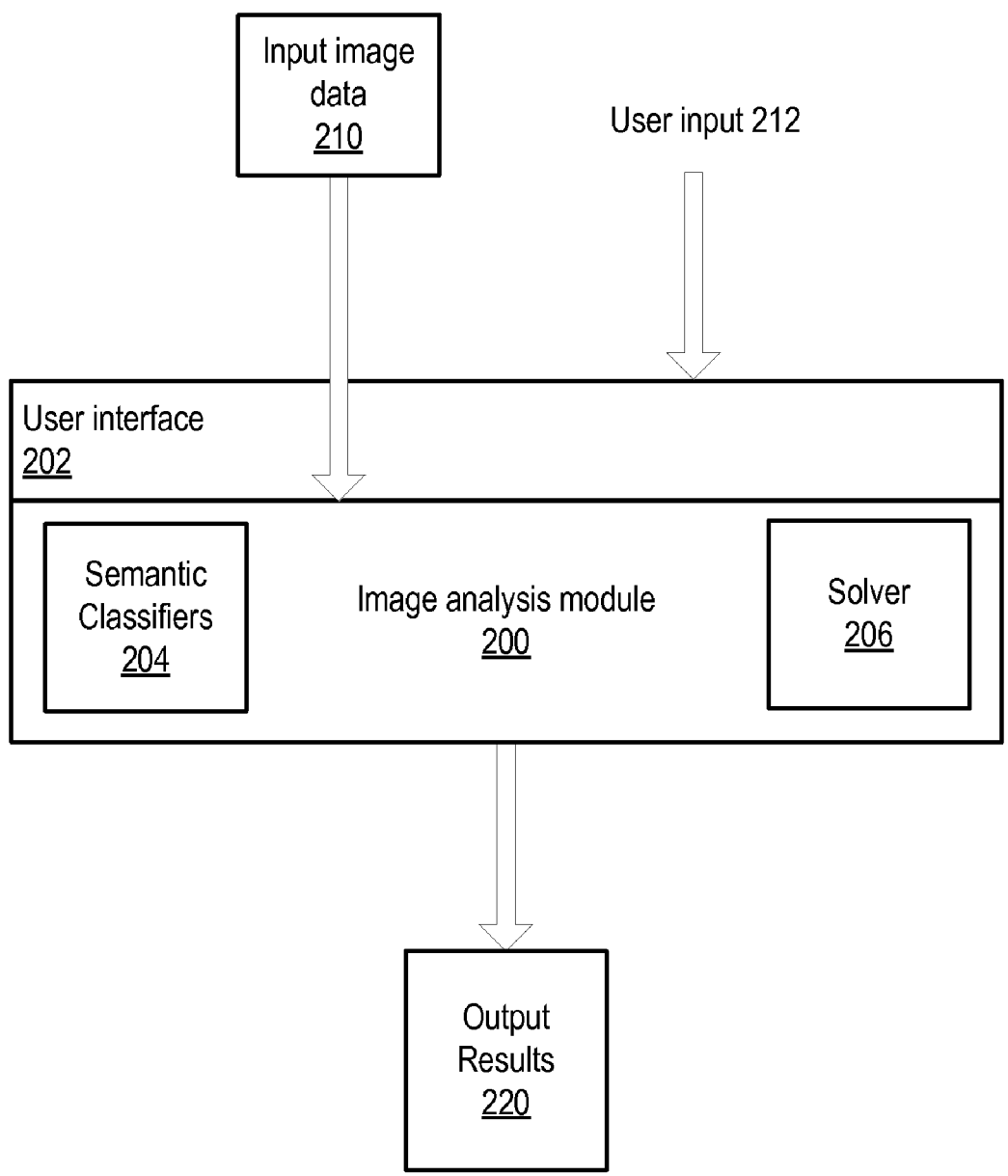
FIG. 2 illustrates an exemplary image analysis module, according to one embodiment.

FIG. 2 illustrates an exemplary image analysis module that may implement embodiments of methods disclosed herein, as described below with reference to FIGS. 3, 4, and 5. In one embodiment, module 200 may provide a user interface 202 that includes one or more user interface elements via which a user may initiate, interact with, direct, and/or control the method performed by module 200. Module 200 may be operable to obtain digital image data for a digital image 210, receive user input 212 regarding the image data, analyze the image data and/or the input, and output analysis results for the image data 220. In one embodiment, the module may include or have access to a plurality of semantic image classifiers, as will be discussed in detail below. Further details regarding the functionality provided by the module 200 are discussed below.

Image analysis module 200 may be implemented as or in a stand-alone application or as a module of or plug-in for an image processing and/or image management application, e.g., for managing a photograph collection or archive. Examples of types of applications in which embodiments of module 300 may be implemented may include, but are not limited to, image analysis and editing, processing, and/or presentation applications, as well as applications in security or defense, educational, scientific, medical, publishing, digital photography, digital films, games, animation, marketing, and/or other applications in which digital image analysis, editing or presentation may be performed. Specific examples of applications in which embodiments may be implemented include, but are not limited to, Adobe® Photoshop® and Adobe® Illustrator®. Module 300 may also be used to display, manipulate, modify, classify, and/or store images, for example to a memory medium such as a storage device or storage medium.

Overview

Embodiments of the techniques disclosed herein may provide for categorization and/or search of digital images, e.g., for a digital image (e.g., photograph) collection or archive, such as a personal photograph collection. More specifically, techniques for automatically annotating digital images and enabling semantic image search on personal image collections are discussed, where, for example, using available computer vision and machine learning techniques, a set of relevant semantic category scores that can be meaningfully interpreted by humans and accurately learned by computers, referred to as semantic categories, are automatically assigned to every image, where the set of relevant semantic category scores compose a semantic category profile assigned to each image. In other words, the semantic category profile includes multiple semantic categories applicable to the image. Techniques are described that utilize the semantic category profiles to help users annotate (e.g., suggest keywords for) digital images (e.g., photographs) and enable users to retrieve images through semantically meaningful queries or user interfaces. Applications that use semantic category profiles to improve semantic image search are described, as well as novel techniques for evaluating the information content of automatic semantic (scene/location, time, etc.) classifiers. Semantic image search techniques that seek to maximize information gain, e.g., per query, are also presented.

Semantic Category Based Image Categorization/Annotation and Semantic Search

Embodiments of the techniques described herein may facilitate development of an image classification system that includes multiple automatic semantic classifiers (e.g., on the order of around 20). The classifiers may be operable to classify and/or discriminate images based on any of various image attributes, such as, for example, environmental scenes (e.g., indoors, outdoors, waterscape, landscape, snow/winter, cityscape, etc.), temporal intervals (e.g., daytime, nighttime, etc), the presence of people (e.g., single person, two people, a few people, crowd, no people, etc.), perspective (e.g., wide angle, telephoto, etc.), and possibly other significant visual features (e.g., brightly saturated colors, etc.). It should be noted, however, that the above categories are intended to be exemplary only and are not intended to limit the semantic categories used to any particular set, form, function, or names.

In some embodiments, the semantic classifiers may be built using all (or substantially all) available input information, including, for example, feature themes based on colors and textures, as well as camera/image metadata. The final selection of semantic categories used by the classifiers may generally be based on three principles: 1) relevance—the categories partition images present in the image collection somewhat evenly, 2) consistency—the categories are semantically meaningful, and 3) accuracy—the categories can be learned and automatically assessed by a machine. These principles are expressed in more formal terms below.

Figure 3:
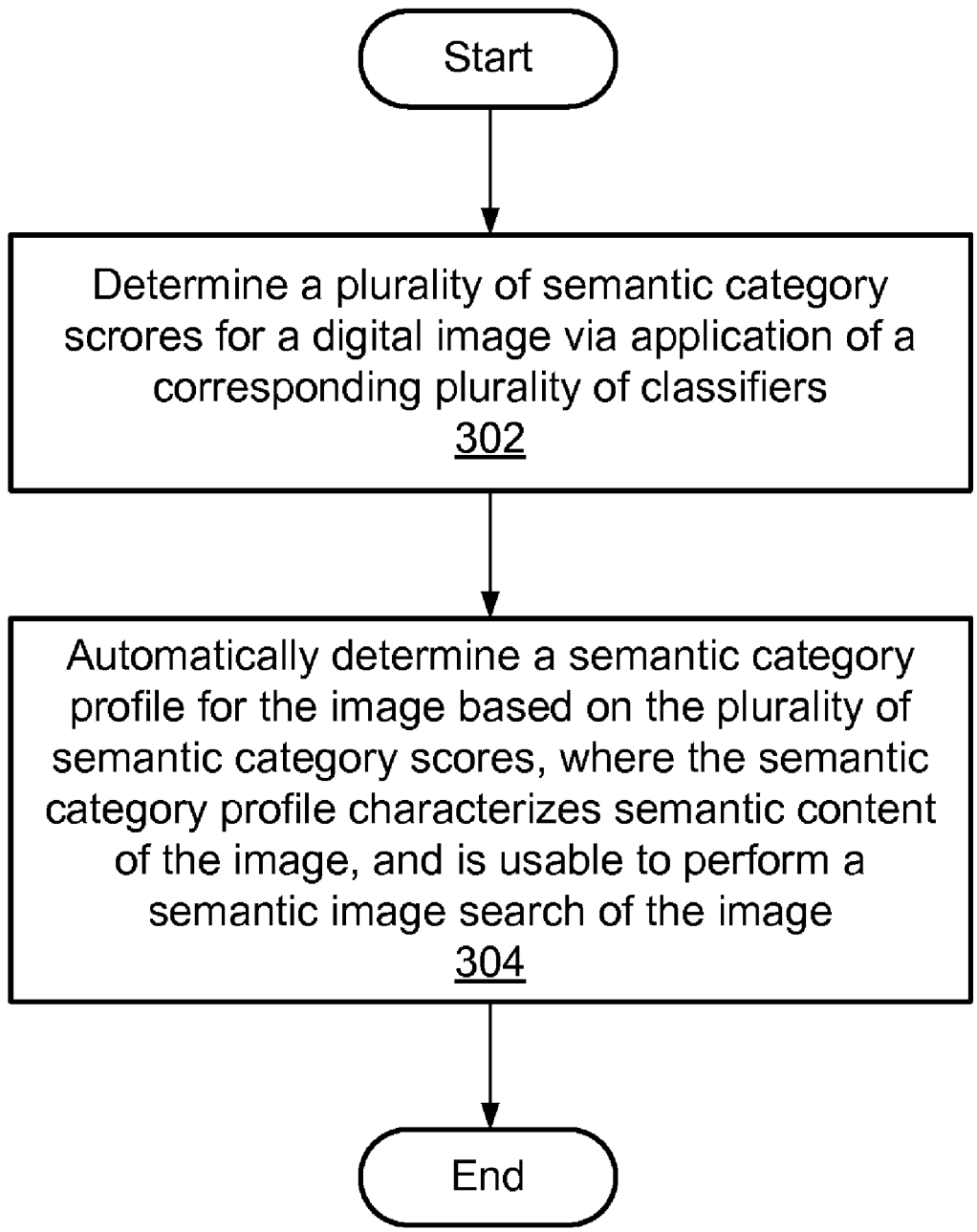
FIG. 3 is a flowchart illustrating a method for automatically categorizing a digital image, according to one embodiment.

FIG. 3—Method for Categorizing Digital Images

FIG. 3 is a flowchart of a method for categorizing digital images, according to one embodiment. The method shown in FIG. 3 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 302, a plurality of semantic category scores for an image may be determined via application of a corresponding plurality of classifiers. Note that the plurality of classifiers may be separate programs or processes, or may be implemented as a single (or several) generic classifier with sub-processes or sub-programs implementing the respective functionality of the plurality of classifiers. In other words, in some embodiments, the plurality of classifiers compose at least one generic classifier that includes a plurality of sub-programs respectively implementing at least a subset of the plurality of classifiers. For example, one generic classifier may implement all of the plurality of classifiers, or multiple generic classifiers may each implement a respective subset of the plurality of classifiers, thereby implementing the plurality of classifiers. Note further that in various embodiments, the application of the plurality of classifiers may be performed serially, concurrently, or a mixture of both, e.g., on a single computing device, or via multiple devices, possibly operating in conjunction, e.g., over or via a network.

As noted above, each classifier is associated with a respective semantic category, and may operate to analyze the image (e.g., image data and/or image meta-data, such as EXIF data) and determine a score for the image with respect to that semantic category. For example, in some embodiments, the score may range from zero to 1, where zero denotes no or minimum applicability of the semantic category to the image, and 1 denotes full or maximum applicability of the semantic category to the image, although any other scoring scheme may be used as desired.

In 304, a semantic category profile for the image may be automatically determined based on the plurality of semantic category scores, where the semantic category profile characterizes semantic content of the image, and is useable to perform semantic based operations with respect to the image, e.g., semantic image searches, keyword determination or identification, image characterization, and so forth. In one embodiment, the semantic category profile comprises the semantic category scores.

In some embodiments, the above method elements may be performed for each image in a collection of images, thus facilitating subsequent semantic content-based operations with respect to the collection, e.g., semantic image searches, classifier evaluations, etc., as will be described in more detail below.

In some embodiments, the system may utilize the above semantic category profiles to implement one or more of the following features related to image classification, annotation, and/or semantic search.

Automatic Content Aware Keyword Suggestion

In one embodiment, automatic content aware keyword suggestion functionality may be provided, where, given an image, relevant keywords may be suggested for the image.

Figure 4:
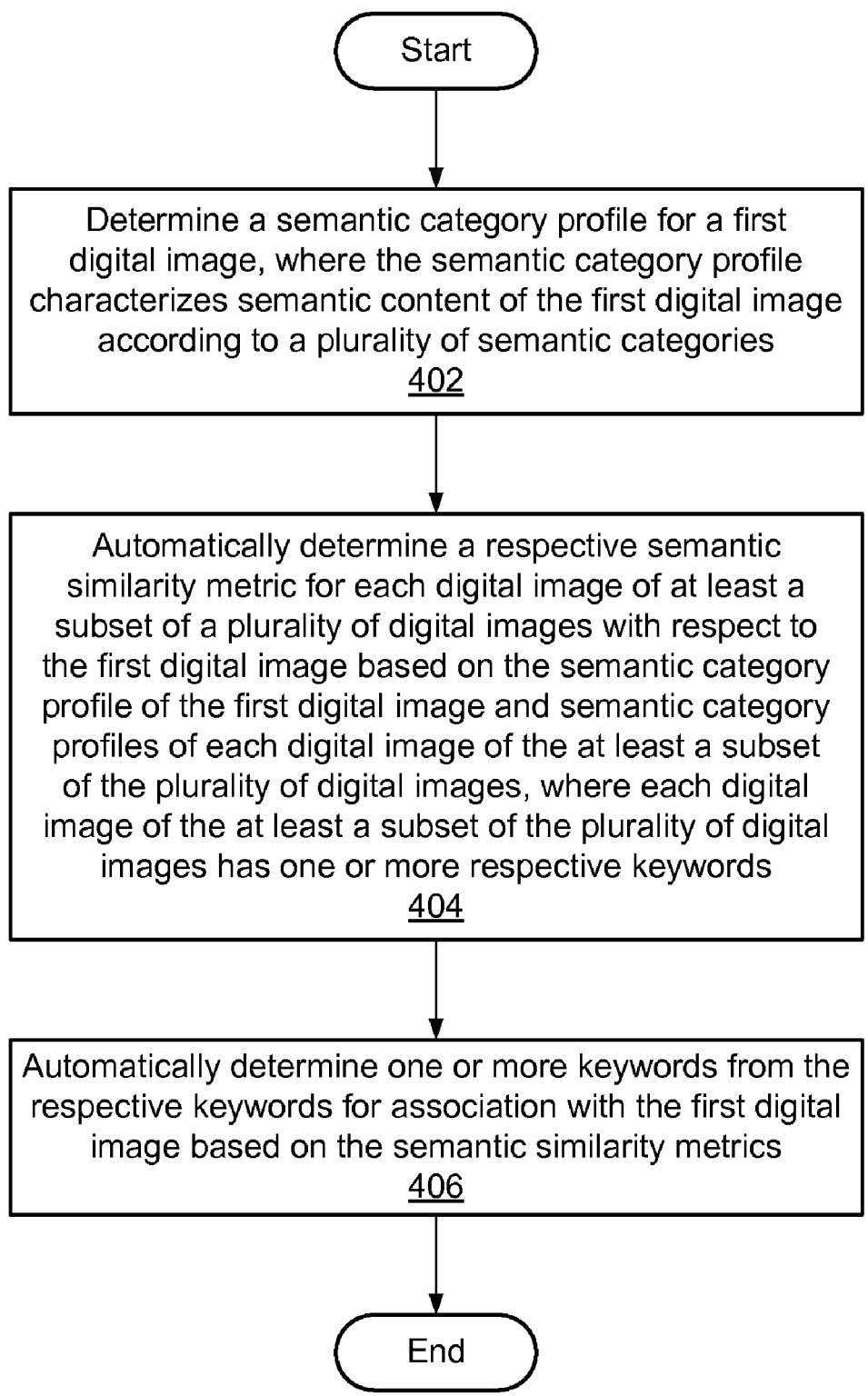
FIG. 4 is a flowchart of a method, for determining keywords for digital images, according to one embodiment.

FIG. 4—Method for Determining Keywords for Digital Images

FIG. 4 is a flowchart of a method for determining keywords for digital images, according to one embodiment. The method shown in FIG. 4 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 402, a semantic category profile for a first digital image may be determined, where the semantic category profile characterizes semantic content of the first digital image according to a plurality of semantic categories.

In 404, a respective value of a semantic similarity measure, e.g., a semantic similarity score for each digital image of at least a subset of a plurality of digital images may be automatically determined with respect to the first digital image based on the semantic category profile of the first digital image and semantic category profiles of each digital image of the at least a subset of the plurality of digital images. Each digital image of the at least a subset of the plurality of digital images may have one or more respective keywords (associated with the digital image). Note that for convenience, the value of the semantic similarity measure may be referred to herein simply as the semantic similarity measure.

In 406, one or more keywords from the respective keywords may be automatically determined for association with the first digital image based on the values of the semantic similarity measure.

Thus, for example, in one embodiment, annotated (i.e., tagged with keywords) images $I_i$ in a collection of digital images, e.g., a user's photograph collection, may be analyzed, and semantic category profiles $S(I_i)$ computed for each image. Given an input image I, its semantic category profile $S(I)$ may be computed. The similarity of image I to other annotated images $I_i$ in the collection (or other annotated collection) may be determined based on a similarity measure $\phi(S(I),S(I_i))$, and one or more keywords suggested based on keywords that are assigned to similar images based on the values of the similarity measure.

Content Aware Keyword Expansion

Content aware keyword expansion, in which, given a keyword or category for an image, related keywords are automatically suggested (e.g., for further annotation/categorization of the image), may significantly improve the effectiveness and/or efficiency of subsequent searches for the image. In other words, given an image I that is already partially annotated and contains at least one keyword, a keyword expansion process may suggest additional related keywords to the user.

Prior art keyword expansion approaches typically determine how frequently other keywords co-occur with existing keywords in a user's collection of photographs, and suggest words that frequently appear together with the existing keywords but are not yet assigned to image I. In other words, the suggested keywords are selected based on a weighting in accordance with the frequency of co-occurrence of keywords. In some prior art approaches, analysis of images at pixel-level, or using low-level visual features is used to augment or further weight candidate keywords to determine suggested keywords. However, these approaches fail to take more complex, higher-level image content that has meaningful interpretations, i.e., semantic category profiles of images, into account in suggesting keywords or tags.

In one embodiment, the one or more keywords of 406 above may be suggested to the user as a keyword expansion. In other words, the one or more keywords may be proposed to the user for association with the first digital image, e.g., for subsequent use in semantic search operations, among other applications, as described below.

In one embodiment, the first digital image may be associated with at least one keyword. Automatically determining a respective value of a semantic similarity measure (e.g., score)

for each digital image of at least a subset of a plurality of digital images may then include automatically determining co-occurrence of keywords associated respectively with each digital image of the plurality of digital images with respect to the at least one keyword of the first digital image. Note that the at least a subset of the plurality of digital images are those digital images with co-occurring keywords. Moreover, the above automatically determining the one or more keywords from the respective keywords for association with the first digital image based on the values of the semantic similarity measure may include automatically determining one or more keywords from the co-occurring keywords based on the values of the semantic similarity measure for association with the first digital image.

For example, in some embodiments, the co-occurring keywords may be weighted based on the semantic similarity of the associated images, i.e., based on the value of the semantic similarity measure or score for the images. Thus, for example, a co-occurring keyword for an image that is semantically similar to the first digital image may be weighted much more strongly than a co-occurring keyword for an image that is not so semantically similar, and thus may be suggested "more strongly" for annotation, e.g., appearing before the other in a ranked list of suggested keywords. As another example, a threshold may be specified whereby the heavily weighted keyword may be suggested, while the less weighted keyword may not.

Thus, for example, in one embodiment, a content aware (e.g., semantic) keyword expansion functionality may be provided in which semantic category profiles $S(I_i)$ are computed for all images I in a collection, e.g., a database, archive, etc., of annotated photographs or other digital images. An image $I_i$ may be analyzed and its semantic category profile $S(I_i)$ computed. Keyword expansion may then be performed based on the co-occurrence of other keywords with (the one or more) existing keywords that are associated with the image. Moreover, for every photo $I_i$ that contains the existing keywords, the contribution of co-occurrence may be weighted according to a function $\phi'(S(I),S(I_j))$, which may or may not be the same as $\phi$, above, where images that are similar (in the sense of semantic category profile) to the current image are weighted more strongly. Thus, the suggested keywords may be based at least partially on contributions from image content, i.e., the similarity of image content of other images other images $I_j$ to image $I_i$ (where j not equal i) may influence the degree to which their associated (co-occurring) keywords are considered for suggestion to the user regarding annotation/labeling of image $I_i$.

Semantic Image Search

In some embodiments, semantic image search functionality may be provided, where, given one or more keywords, related images in an image collection may be determined and indicated to the user.

Figure 5:
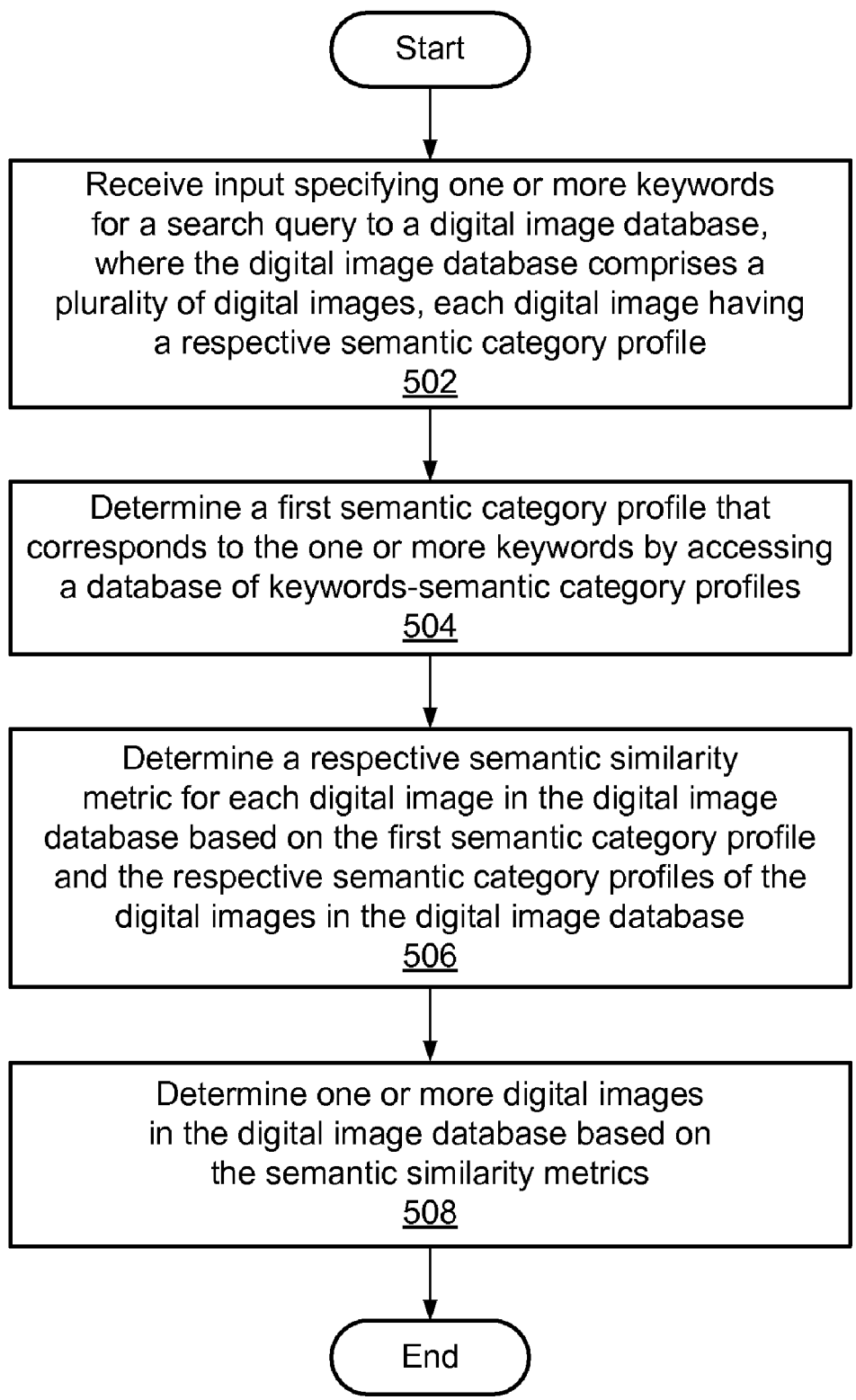
FIG. 5 is a flowchart of a method for performing semantic image searches, according to one embodiment, according to one embodiment.

FIG. 5—Method for Performing Semantic Image Searches

FIG. 5 is a flowchart of a method for performing semantic image searches, according to one embodiment. The method shown in FIG. 5 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 502, input specifying one or more keywords for a semantic image search query to a digital image database may be received. The digital image database may include a plurality of digital images, each digital image having a respective semantic category profile.

In 504, a first semantic category profile may be determined that corresponds to the one or more keywords. For example, in one embodiment, a database of keywords-semantic category profiles may be provided that encodes correspondence between keywords and semantic category profiles, and the first semantic category profile may be determined by accessing the database. Note that the term "database" is intended to cover any of various technologies or data structures whereby such correspondences may be stored and accessed.

In 506, a respective value of a semantic similarity measure, e.g., a semantic similarity score, may be determined for each digital image in the digital image database based on the first semantic category profile and the respective semantic category profiles of the digital images in the digital image database. In other words, semantic category profiles for the images may be determined first, then values of a semantic similarity measure determined by comparing each image's semantic similarity profile to the first image's semantic profile.

In 508, one or more digital images in the digital image database may be determined (e.g., identified) based on the values of the semantic similarity measure. An indication of the determined one or more digital images may then be provided to the user. Note that indicating the one or more digital images may be performed in any of various ways, e.g., displaying the images to the user, displaying the names and/or locations of the images, etc., as desired.

Thus, for example, in one embodiment, a database (or other data structure) of keywords/semantic category profiles may be provided (or created). Semantic category profiles may be pre-computed for all (annotated and un-annotated) images in a collection of images, e.g., a user's image (e.g., photograph) collection. When a user performs a semantic image search via a query Q consisting of or comprising keywords, the keywords may be converted into or used to determine corresponding semantic category profiles S(Q) based on the database. A search through the image collection may then be performed by analyzing the semantic category profiles of the images, and images $I_j$ whose semantic category profiles $S(I_j)$ are sufficiently similar to $S(I_i)$ based on some similarity measure $\phi''(S(I),S(I_j))$ determined and indicated. Note that the similarity measure $\phi''$ may or may not be the same as $\phi$ and/or $\phi'$, above.

Similarity Measure

Function $\phi(S(I_i), S(I_j))$ may measure or express the semantic similarity between two digital images, e.g., digital photographs, and thus may be considered a semantic similarity measure. The following describes exemplary embodiments of the semantic similarity measure(s) mentioned above; however, it should be noted that the embodiments described herein are meant to be exemplary only, and are not intended to limit the measure(s) to any particular form, function, or appearance.

Treating $S(I_i)$ and $S(I_j)$ as points in a high dimensional space and defining $\phi$ as their Euclidean distance (in which case, a smaller distance indicates more similar images), in one embodiment, the semantic similarity measure may be of the form:

$$\phi(S,S') = \|S-S'\| \quad (1)$$

In other embodiments, the semantic similarity measure may be similar to that of equation (1), but may use other distance measures, e.g.:

$$\phi(S,S')=\|S-S'\|_1$$

$$\phi(S,S')=\|S-S'\|_2$$

$$\phi(S,S')=\|S-S'\|_p \text{ for some value } p \quad (2)$$

In yet other embodiments, treating $S(I_i)$ and $S(I_j)$ as vectors, and defining the similarity as their dot product, or angle between the vectors (in which case, a larger dot product indicates more similar images), the semantic similarity measure may be:

$$\phi(S,S')=S \cdot S' \quad (3)$$

In further embodiments, the semantic similarity measure may be similar to that of equation (3), but may include a weight factor, e.g., obtained from multidimensional analysis based on experimental data, where a different weight may be determined for each application, e.g.:

$$\phi(S,S')=(S \cdot S')_W \quad (4)$$

In yet further embodiments, treating $S(I_i)$ and $S(I_j)$ as probability distributions and measuring the similarity using entropy measures such as symmetric Kullback-Leiber divergence, or Jensen-Shannon divergence (in which case, a smaller divergence indicates similar images), the semantic similarity measure may take other forms, such as:

$$\phi(S,S')=0.5KL(S\|S')+0.5KL(S'\|S) \quad (5)$$

or $$\phi(S,S')=JS(S,S') \quad (6)$$

where KL and JS denote Kullback-Leiber divergence and Jensen-Shannon divergence, respectively.

Thus, the semantic similarity measure(s) discussed above may be implemented in any of various ways, as desired.

Information Content of Semantic Categories

Prior art approaches to semantic (scene) classification in the fields of computer vision and machine learning tend to evaluate classifiers by the accuracy of the learning algorithm. However, learning accuracy is only one of the factors that determine the effectiveness of using semantic categories for semantic image search.

Scene or semantic image classifiers generally operate to partition a set or collection of images into two subsets based on a query, specifically, into a selected subset, which is returned by the query, and an unselected subset, i.e., those remaining after the selection. Each query operates to provide information regarding the set of images being searched based on the distinguishing categories specified for the set of images, and thus, the categories specified for a set of images may be considered to have a degree of information content with respect to the images. Since the classifiers operate based on the specified categories, the information content of a set of automatic semantic image classifiers may be evaluated. Based on this concept, a proposed set of categories may be evaluated, and a subset that effectively spans the semantic categories/content of a collection may be determined, or one set of categories may be evaluated with respect to another.

Three criteria may be specified for evaluating how effectively (in terms of translating search queries from the user into useable information) a set of automatic semantic classifiers can help a user locate an image. Moreover, the information gain and information loss due to these three factors can be quantified in a unified information theoretic measure.

In one embodiment, the criteria include:
1. Relevance (with respect to a collection of digital images (e.g., digital photographs))
2. Consistency (i.e. human classification consistency)
3. Accuracy (i.e. automatic (e.g., machine) classification accuracy)

Relevance may be defined with respect to an image collection and describes how well a semantic category partitions the images in the collection. For example, a semantic classifier that identifies "urban" is irrelevant with respect to an image (e.g., a photograph) collection of a camping trip in Mojave Desert. Asking the query "is the photo taken in an urban environment?" would always incur a negative response and does not help a user narrow down the range of photos to search. Ideally, a relevant semantic category should partition an image collection into two equal parts, so knowing the response reduces the number of remaining images to search by half, although it should be noted that this is not generally the case in real-world applications, but rather, is a useful theoretical target.

Consistency describes the inherent amount of ambiguity in assigning a semantic category to images. For example, given a semantic category, such as "urban", if a set of photos is divided into "urban" and "not urban" subsets, there are bound to be some ambiguous images, e.g., showing the edge of the city adjacent to an open country. Consistency measures or represents the minimum amount of disagreement that a human classifier (considered optimal) would find, given an optimal partitioning of images. Some semantic categories are inherently more inconsistent than others. For example, a semantic classifier that identifies the mood of the image as "happy" can be highly inconsistent. What one person considers "happy" may differ greatly from the next person. Intuitively, inconsistent categories reduce the information content of a scene because the answer is ambiguous and the user must perform additional queries to clarify the ambiguity.

Accuracy describes how accurately an automatic classifier can classify a specific semantic category. Intuitively, inaccurate responses also reduce the information content of a semantic classifier as a user needs to perform additional queries to ensure the automatic classifier responses are indeed correct.

These three concepts may be tied together or related through the notion of entropy. In information theory, entropy may be defined as the number of bits required to uniquely specify an item from a collection. Let I be a discrete random variable over a collection of n images. $P(I=i)$ is the probability that image i is the target image the user is looking for. If $P(I)$ is a uniform distribution, entropy $H(I)$ is $\log_2(n)$. $H(I)$ decreases as $P(I)$ becomes less uniform, and $H(I)$ reaches 0 if and only if $P(I=i)=1$ for a unique i, and $P(i)=0$ otherwise.

Information content measures how much knowing the response of an automatic semantic classifier can help a user narrow a subset of images from the collection down to a relevant part or to a desired image, i.e., to "drill down" to a relevant subset or specific image. Let $H=[0, 1]$ be the search query from the user expressed in terms of a semantic category. Note that $H=1$ implies that the user considers the image to be retrieved as belonging to the semantic category. $H=0$ implies that the image to be retrieved does not belong to the semantic category. Let $M=[0, 1]$ be the output from a classifier for the corresponding category. $P(I=i|M,H)$ is the conditional probability that image i is the image the user is looking for given a search query H from the user and given knowledge about output of the semantic classifier M from the machine. $H(I|M,H)$ is the corresponding conditional entropy, or the remaining number of bits required to uniquely specify an image. Information content J may thus be defined as $H(I)-H(I|M,H)$, or the reduction in entropy after knowing H and M.

$P(I|M,H)$ can be decomposed into a product of three conditional probabilities, where the three probabilities correspond to the three criteria mentioned above, and can be quantitatively measured or determined. Thus, $P(I|M,H)$ and $H(I|M,H)$ may be numerically evaluated.

Let $L=\{0, 1\}$ be the binary category label given an image (i.e. whether an image belongs to a category).

Assuming that H, M, and I are independent from one another L, it can be shown that $$P(I|M,H)=\eta\Sigma_L P(M|L)P(H|L)P(I,L) \quad (7)$$

where:

$P(M|L)$ is the conditional probability representing accuracy, and corresponds to how likely the output from an automatic semantic classifier matches the label L given to an image. This quantity is the cross validation error of the machine learning algorithm;

$P(H|L)$ is the conditional probability representing consistency, and corresponds to the percentage of the people (human response) agreeing with the label L given to an image. This quantity can be obtained through a user study; and $P(I, L)$ is the joint probability representing relevance, and may comprise a list of pairs of numbers indicating the image I and its corresponding label L. This quantity can be obtained by manually labeling a subset of the image collection.

For a set of semantic categories, the information content may be defined as $J=H(I)-H(I|M1, M2, \ldots, Mk, H1, H2, \ldots, Hk)$, or the reduction in entropy given the user queries H1, H2, ..., Hk and machine responses M1, M2, ..., Mk for k semantic classifiers.

Given any set of automatic semantic classifiers, the degree to which knowing the semantic category helps a user specify an image from a collection may be quantitatively evaluated by accounting for:

1. how relevant the category is to the images in the collections;
2. how consistently people can identify the semantic category; and
3. how accurately an automatic classifier can classify the semantic category.

Various utilities and applications of the above evaluation criteria are now described.

Figure 6:
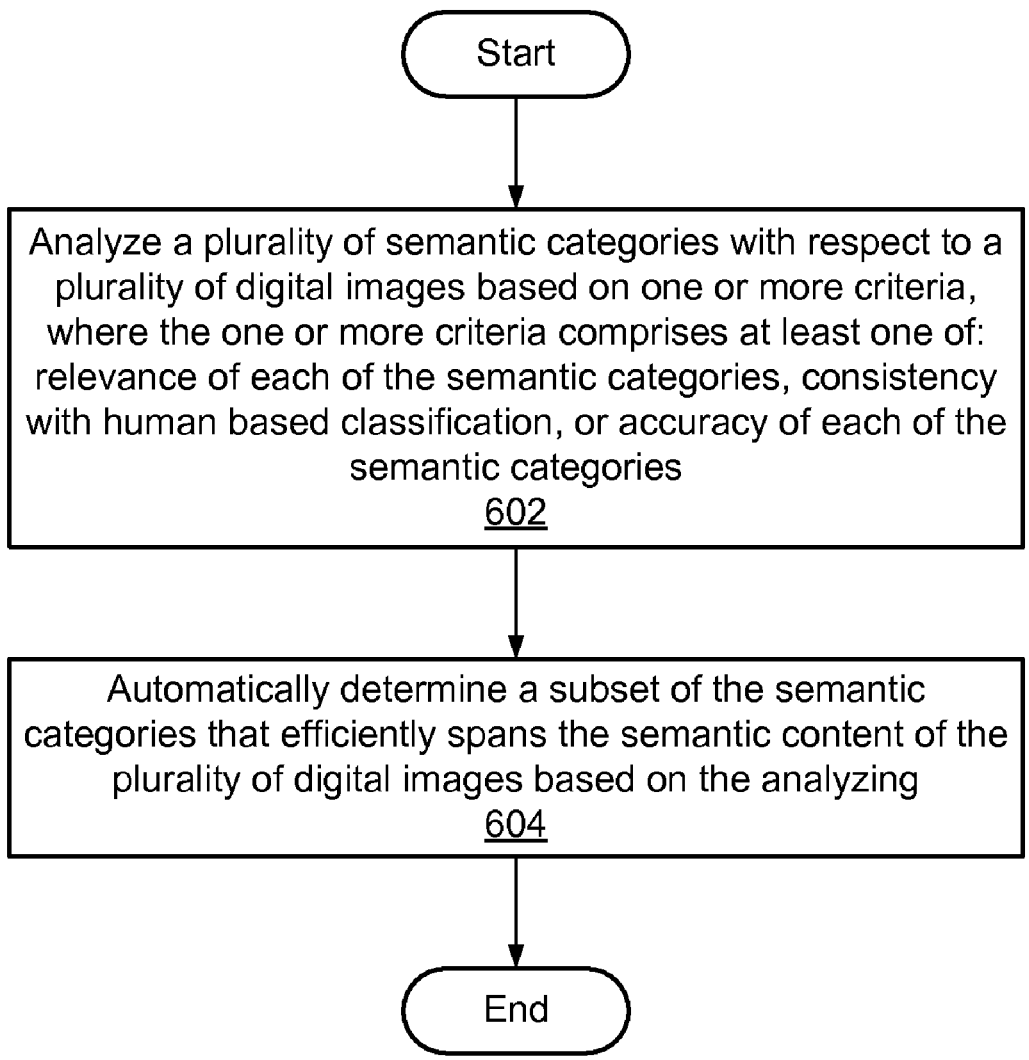
FIG. 6 is a flowchart of a method for determine effective or efficient semantic categories for images, according to one embodiment.

FIG. 6—Method for Determining Semantic Categories

In some embodiments, the above concepts may be used to analyze and evaluate semantic categories, e.g., for use in semantic image categorization, characterization, and/or searching, etc. FIG. 6 is a flowchart of a method for determine effective or efficient semantic categories for images, according to one embodiment. The method shown in FIG. 6 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 602, a plurality of semantic categories may be analyzed with respect to a plurality of digital images based on one or more criteria. In one embodiment, the one or more criteria may include at least one of: relevance of each of the semantic categories; consistency with human based classification; or accuracy of each of the semantic categories.

In 604, a subset of the semantic categories that efficiently spans the semantic content of the plurality of digital images may be automatically determined based on said analyzing.

For example, in one embodiment, each of the semantic categories may be analyzed and scored according to one or more of the criteria, and a "best" subset of the semantic categories determined, where the subset of semantic categories spans or effectively covers and distinguishes among the semantic content of the images. These semantic categories may thus be effective in a semantic image search, e.g., may be expected to facilitate efficient partitioning of the plurality of digital images in a semantic image search.

Figure 7:
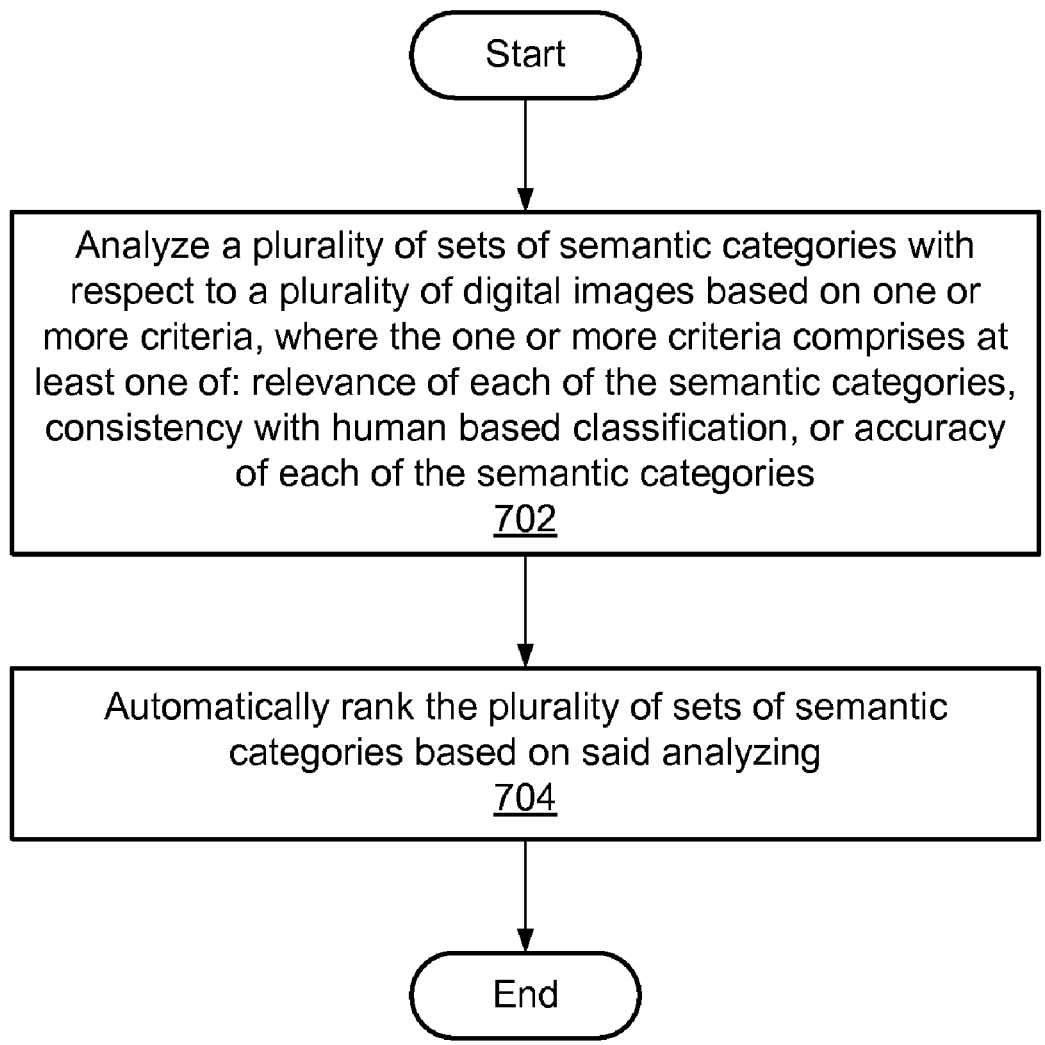
FIG. 7 is a flowchart of a method of a method for evaluating semantic categories for images, according to one embodiment.

FIG. 7—Method for Evaluating Semantic Categories

In some embodiments, the above concepts may be used to analyze and evaluate semantic categories. FIG. 7 is a flowchart of a method for evaluating semantic categories for images, according to one embodiment. The method shown in FIG. 7 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 702, a plurality of sets of semantic categories may be analyzed with respect to a plurality of digital images based on one or more criteria. In one embodiment, the one or more criteria may include at least one of: relevance of each of the semantic categories; consistency with human based classification; or accuracy of each of the semantic categories.

In 704, the plurality of sets of semantic categories may be ranked based on said analyzing.

For example, in one embodiment, each of the sets of semantic categories may be analyzed and scored according to one or more of the criteria, and then ranked based on the scores. This ranking may then be used for any of various purposes. For example, in one embodiment, a list of the ranked sets of semantic categories may be presented to a user, possibly with their respective scores. In one embodiment, the user may then specify one of the sets of semantic categories (e.g., the highest ranked set) to apply to the plurality of digital images, e.g., to characterize the images, to perform semantic image searches, etc., as desired. In another embodiment, the highest ranking set of semantic categories may automatically be selected and used for characterization and/or search operations with respect to the images.

Thus, various embodiments of the above method may be used to evaluate and compare proposed sets of semantic categories for a collection of images. Such "customization" or "tailoring" of the semantic categories to a specific image set or collection may improve the effectiveness or efficiency of operations with respect to the images, e.g., semantic image searching, etc.

In one embodiment, the evaluation techniques discussed above may be used to characterize image sets. In other words, embodiments of the above methods may be used to determine sets of categories and/or keywords that effectively describe or characterize the type and/or range of semantic content of a set of digital images. Note that this type of characterization may be applied to any type of digital image collection, e.g., photographs, art collections, etc.

Information Driven Semantic Image Search

In some embodiments, the information content related notions described above may be used to provide feedback to a user during an image search to facilitate iteratively culling and ranking semantic categories for (remaining) images being searched.

Figure 8:
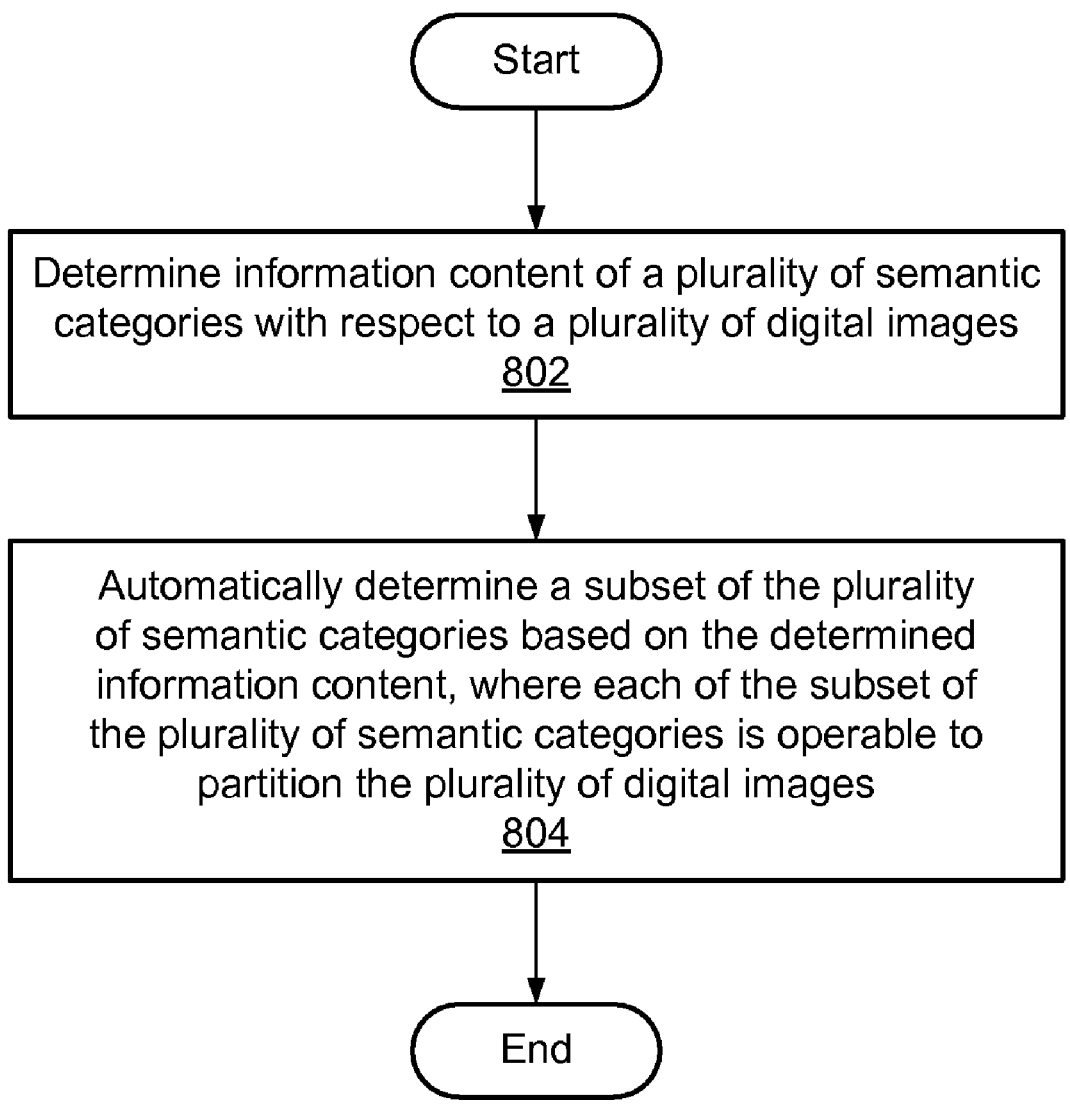
FIG. 8 is a flowchart of a method or selecting a subset of semantic categories most effective or efficient for semantic image searches, according to one embodiment.

FIG. 8—Method for Performing Semantic Image Searches

FIG. 8 is a flowchart of a method for performing semantic image searches, according to one embodiment. The method shown in FIG. 8 may be used in conjunction with embodiments of the computer system shown in FIG. 2, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 802, information content of a plurality of semantic categories may be determined with respect to a plurality of digital images.

In 804, a subset of the plurality of semantic categories may be automatically determined based on the determined information content, where each of the subset of the plurality of semantic categories is operable to partition the plurality of digital images.

Thus, semantic categories that are extraneous or non-functional (or perhaps less functional than desired) with respect to the plurality of digital images may be culled from the original set. Note that this process may be applied to any set of images. Thus, in one embodiment, in response to a search query regarding the images, the method may analyze the current semantic categories associated with the images with respect to the subset of the images returned in response to the search query, and determine a subset of the current semantic categories that are more germane or appropriate to the subset of images. The method may then suggest one or more of the subset of current semantic categories, or keywords associated with those categories, for a subsequent search query. This process may be repeated in an iterative manner to dynamically and interactively facilitate more effective and efficient semantic image searches, i.e., content-aware image searches. In some embodiments, the method may rank the suggested categories or keywords, and may present the best one or more categories or keywords, possibly with scoring information. The user may then create a subsequent query using the ranked categories or keywords as a guide.

For example, given the information content measures or criteria described above, one can estimate and rank which classifier(s) from a set of semantic classifiers (or alternatively, which semantic categories) will be more or most effective in identifying the image a user wishes to retrieve. Instead of passively waiting for the user to extend the input search queries, the search system can actively provide feedback to the user suggesting the type of queries that will most likely yield maximum information gain.

Thus, given an existing semantic image search interface (e.g., search by keyword, faceted search, etc.), possibly after the user has entered a query (either in the form of a set of keywords or in the form of filters), the system may identify a current set of candidate images (e.g., digital photographs). The system may then compute the information content of semantic categories with respect to the current set of candidate images and select a subset of categories the response to which may generate maximum information gain.

Thus, for example, in the case of a search by keyword, the system may provide feedback to the user regarding how to refine the query to obtain more accurate search results. For example, given a digital image collection and a search query of "Manhattan, New York City, downtown, taxi", the system may provide feedback indicating that there are already a sufficient number of environmental search terms and that specifying additional location related keywords will likely yield very similar search results. On the other hand, the system may also suggest that the user clarify whether the target image contains a crowd, a single person, or no one at all, and may indicate that such additional information may significantly narrow down the number of candidate images.

In the case of a faceted search interface, the system may provide feedback to the user regarding the effectiveness of filtering each dimension. Thus, for example, when a user loads up a digital photograph collection from a weekend camping trip and wishes to search for an image, the system may suggest that as a first step, filtering along "daytime—nighttime" is useful, filtering along "beach" and "mountain" are moderately useful, and that as the user has taken some photos of flowers, filtering along "close-up photos" is useful. After the user selects "close-up photos" and sees a screen full of flowers, the system may suggest that as a second step, filtering by the dominant color of the photograph would then be the most effective search term.

Thus, possibly in response to a query by a user, the system (or method) may analyze and identify a current set of candidate images (e.g., digital photographs), determine the information content of semantic categories with respect to the current set of candidate images, and select a subset of categories or related keywords that, if submitted in a further query, may generate maximum information gain, i.e., may more (or even most) effectively partition the candidate images so as to narrow the selected subset down toward the final desired image, possibly repeating this process for each subsequent query.

Thus, various embodiments of the systems and methods disclosed herein may facilitate semantic digital image categorization and/or semantic digital image searches.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A non-transitory computer-readable storage medium that stores program instructions computer-executable to implement:

determining a plurality of semantic category scores for a digital image via application of a corresponding plurality of classifiers;

automatically determining a semantic category profile for the image based on the plurality of semantic category scores, wherein the semantic category profile characterizes semantic content of the image, and is useable to perform semantic based operations with respect to the image; and performing a semantic based operation wherein the semantic based operation comprises:

a search operation based on a semantic similarity measure for a plurality of semantic category profiles for a plurality of digital images, wherein the plurality of semantic category profiles includes the semantic category profile for the image; or a keyword operation based on a semantic similarity measure for a plurality of semantic category profiles for a plurality of digital images, wherein the plurality of semantic category profiles includes the semantic category profile for the image.

2. The non-transitory computer-readable storage medium of claim 1, wherein the digital image is comprised in the plurality of digital images, wherein the program instructions are further computer-executable to implement:

performing said determining a plurality of semantic category scores and said automatically determining a semantic category profile for each other digital image of the plurality of digital images.

3. The non-transitory computer-readable storage medium of claim 1, wherein the plurality of classifiers composes at least one generic classifier comprising a plurality of sub-programs respectively implementing at least a subset of the plurality of classifiers.

4. The non-transitory computer-readable storage medium of claim 1, wherein the application of the plurality of classifiers is performed serially and/or concurrently.

5. The non-transitory computer-readable storage medium of claim 1, wherein the application of the plurality of classifiers is performed via multiple devices operating in conjunction over a network.

6. The non-transitory computer-readable storage medium of claim 1, wherein the semantic category profile for the image comprises the plurality of semantic category scores.

7. The non-transitory computer-readable storage medium of claim 1, wherein the digital image is comprised in the plurality of digital images, wherein the program instructions are further computer-executable to implement:

automatically determining a respective value of the semantic similarity measure for each digital image of at least a subset of the plurality of digital images with respect to the first digital image based on the semantic category profile of the first digital image and semantic category profiles of each digital image of the at least a subset of the plurality of digital images, wherein each digital image of the at least a subset of the plurality of digital images has one or more respective keywords; and automatically determining one or more keywords from the respective keywords for association with the first digital image based on the values of the semantic similarity measure.

8. The non-transitory computer-readable storage medium of claim 7, wherein the first digital image is associated with at least one keyword;

wherein said automatically determining the value of a respective semantic similarity measure for each digital image of at least a subset of a plurality of digital images comprises:

automatically determining co-occurrence of keywords associated respectively with each digital image of the plurality of digital images with respect to the at least one keyword of the first digital image, wherein the at least a subset of the plurality of digital images comprises the digital images with co-occurring keywords; and wherein said automatically determining the one or more keywords from the respective keywords for association with the first digital image based on the values of the semantic similarity measure comprises:

automatically determining one or more keywords from the co-occurring keywords based on the values of the semantic similarity measure for association with the first digital image.

9. The non-transitory computer-readable storage medium of claim 1, wherein the digital image is comprised in a digital image database, wherein the program instructions are further computer-executable to implement:

receiving input specifying one or more keywords for a search query to a digital image database, wherein the digital image database comprises the plurality of digital images, each digital image having a respective semantic category profile;

determining a first semantic category profile that corresponds to the one or more keywords by accessing a database of keywords associated with the plurality of semantic category profiles;

determining a respective value of the semantic similarity measure for each digital image in the digital image database based on the first semantic category profile and the respective semantic category profiles of the digital images in the digital image database; and determining one or more digital images in the digital image database based on the values of the semantic similarity measure.

10. The non-transitory computer-readable storage medium of claim 1, wherein the digital image is comprised in the plurality of digital images, wherein the program instructions are further computer-executable to implement:

analyzing a plurality of semantic categories with respect to the plurality of digital images based on one or more criteria, wherein the one or more criteria comprise at least one of:

relevance of each of the semantic categories;
consistency with human based classification; or
accuracy of each of the semantic categories; and automatically determining a subset of the semantic categories that efficiently spans the semantic content of the plurality of digital images based on said analyzing.

11. The non-transitory computer-readable storage medium of claim 1, wherein the digital image is comprised in the plurality of digital images, wherein the program instructions are further computer-executable to implement:

analyzing a plurality of sets of semantic categories with respect to the plurality of digital images based on one or more criteria, wherein the one or more criteria comprises at least one of:

relevance of each of the semantic categories;
consistency with human based classification; or
accuracy of each of the semantic categories; and automatically ranking the plurality of sets of semantic categories based on said analyzing.

12. The non-transitory computer-readable storage medium of claim 1, wherein the digital image is comprised in the plurality of digital images, wherein the program instructions are further computer-executable to implement:

determining information content of a plurality of semantic categories with respect to the plurality of digital images; and automatically determining a subset of the plurality of semantic categories based on the determined information content, wherein each of the subset of the plurality of semantic categories is operable to partition the plurality of digital images.

13. A computer-implemented method, comprising:

determining a plurality of semantic category scores for a digital image via application of a corresponding plurality of classifiers; and automatically determining a semantic category profile for the image based on the plurality of semantic category scores, wherein the semantic category profile characterizes semantic content of the image, and is useable to perform semantic based operations with respect to the image;

analyzing a plurality of semantic categories with respect to a plurality of digital images based on one or more criteria, wherein the one or more criteria comprise at least one of:
   relevance of each of the semantic categories;
   consistency with human based classification; or
   accuracy of each of the semantic categories; and
automatically performing:
   determining a subset of the semantic categories that efficiently spans the semantic content of the plurality of digital images based on said analyzing; or
   ranking the plurality of sets of semantic categories based on said analyzing.

14. The method of claim 13, wherein the digital image is comprised in the plurality of digital images, the method further comprising:
   performing said determining a plurality of semantic category scores and said automatically determining a semantic category profile for each other digital image of the plurality of digital images.

15. The method of claim 13, wherein the plurality of classifiers composes at least one generic classifier comprising a plurality of sub-programs respectively implementing at least a subset of the plurality of classifiers.

16. The method of claim 13, wherein the application of the plurality of classifiers is performed serially and/or concurrently.

17. The method of claim 13, wherein the application of the plurality of classifiers is performed via multiple devices operating in conjunction over a network.

18. The method of claim 13, wherein the semantic category profile for the image comprises the plurality of semantic category scores.

19. The method of claim 13, wherein the digital image is comprised in the plurality of digital images, the method further comprising:
   automatically determining a respective value of a semantic similarity measure for each digital image of at least a subset of the plurality of digital images with respect to the first digital image based on the semantic category profile of the first digital image and semantic category profiles of each digital image of the at least a subset of the plurality of digital images, wherein each digital image of the at least a subset of the plurality of digital images has one or more respective keywords; and
   automatically determining one or more keywords from the respective keywords for association with the first digital image based on the values of the semantic similarity measure.

20. The method of claim 19,
   wherein the first digital image is associated with at least one keyword;
   wherein said automatically determining a respective semantic similarity measure for each digital image of at least a subset of a plurality of digital images comprises:
      automatically determining co-occurrence of keywords associated respectively with each digital image of the plurality of digital images with respect to the at least one keyword of the first digital image, wherein the at least a subset of the plurality of digital images comprises the digital images with co-occurring keywords; and
   wherein said automatically determining the one or more keywords from the respective keywords for association with the first digital image based on the values of the semantic similarity measure comprises:
      automatically determining one or more keywords from the co-occurring keywords based on the values of the semantic similarity measure for association with the first digital image.

21. The method of claim 13, wherein the digital image is comprised in a digital image database, the method further comprising:
   receiving input specifying one or more keywords for a search query to a digital image database, wherein the digital image database comprises the plurality of digital images, each digital image having a respective semantic category profile;
   determining a first semantic category profile that corresponds to the one or more keywords by accessing a database of keywords associated with semantic category profiles;
   determining a respective semantic similarity measure for each digital image in the digital image database based on the first semantic category profile and the respective semantic category profiles of the digital images in the digital image database; and
   determining one or more digital images in the digital image database based on the values of the semantic similarity measure.

22. The method of claim 13, wherein the digital image is comprised in the plurality of digital images, the method further comprising:
   determining information content of the plurality of semantic categories with respect to the plurality of digital images; and
   automatically determining a subset of the plurality of semantic categories based on the determined information content, wherein each of the subset of the plurality of semantic categories is operable to partition the plurality of digital images.

23. A system, comprising:
at least one processor; and
a memory coupled to the at least one processor, wherein the memory stores program instructions, wherein the program instructions are executable by the at least one processor to:
   determine a plurality of semantic category scores for a digital image via application of a corresponding plurality of classifiers;
   automatically determine a semantic category profile for the image based on the plurality of semantic category scores, wherein the semantic category profile characterizes semantic content of the image, and is useable to perform semantic based operations with respect to the image; and
   perform a semantic based operation, wherein the semantic based operation comprises:
      a search operation based on a semantic similarity measure for a plurality of semantic category profiles for a plurality of digital images, wherein the plurality of semantic category profiles includes the semantic category profile for the image; or
      a keyword operation based on a semantic similarity measure for a plurality of semantic category profiles for a plurality of digital images, wherein the plurality of semantic category profiles includes the semantic category profile for the image.

24. The system of claim 23, wherein the digital image is comprised in the plurality of digital images, wherein the program instructions are further executable to:

perform said determining a plurality of semantic category scores and said automatically determining a semantic category profile for each other digital image of the plurality of digital images.

25. The system of claim 23, wherein the plurality of classifiers composes at least one generic classifier comprising a plurality of sub-programs respectively implementing at least a subset of the plurality of classifiers.

26. The system of claim 23, wherein the application of the plurality of classifiers is performed serially and/or concurrently.

27. The system of claim 23, wherein the application of the plurality of classifiers is performed via multiple devices operating in conjunction over a network.

28. The system of claim 23, wherein the semantic category profile for the image comprises the plurality of semantic category scores.

29. The system of claim 23, wherein the digital image is comprised in the plurality of digital images, wherein the program instructions are further executable to:
automatically determine the respective semantic similarity measure for each digital image of at least a subset of the plurality of digital images with respect to the first digital image based on the semantic category profile of the first digital image and semantic category profiles of each digital image of the at least a subset of the plurality of digital images, wherein each digital image of the at least a subset of the plurality of digital images has one or more respective keywords; and
automatically determine one or more keywords from the respective keywords for association with the first digital image based on the values of the semantic similarity measure.

30. The system of claim 29,
wherein the first digital image is associated with at least one keyword;
wherein to automatically determine a respective semantic similarity measure for each digital image of at least a subset of the plurality of digital images, the program instructions are executable to:
automatically determining co-occurrence of keywords associated respectively with each digital image of the plurality of digital images with respect to the at least one keyword of the first digital image, wherein the at least a subset of the plurality of digital images comprises the digital images with co-occurring keywords; and
wherein to automatically determine the one or more keywords from the respective keywords for association with the first digital image based on the values of the semantic similarity measure, the program instructions are executable to:
automatically determine one or more keywords from the co-occurring keywords based on the values of the semantic similarity measure for association with the first digital image.

31. The system of claim 23, wherein the digital image is comprised in a digital image database, wherein the program instructions are further executable to:
receive input specifying one or more keywords for a search query to a digital image database, wherein the digital image database comprises the plurality of digital images, each digital image having a respective semantic category profile;
determine a first semantic category profile that corresponds to the one or more keywords by accessing a database of keywords associated with the plurality of semantic category profiles;
determine a respective semantic similarity measure for each digital image in the digital image database based on the first semantic category profile and the respective semantic category profiles of the digital images in the digital image database; and
determine one or more digital images in the digital image database based on the values of the semantic similarity measure.

32. The system of claim 23, wherein the digital image is comprised in the plurality of digital images, wherein the program instructions are further executable to:
analyze a plurality of semantic categories with respect to the plurality of digital images based on one or more criteria, wherein the one or more criteria comprise at least one of:
relevance of each of the semantic categories;
consistency with human based classification; or
accuracy of each of the semantic categories; and
automatically determine a subset of the semantic categories that efficiently spans the semantic content of the plurality of digital images based on said analyzing.

33. The system of claim 23, wherein the digital image is comprised in the plurality of digital images, wherein the program instructions are further executable to:
analyze a plurality of sets of semantic categories with respect to the plurality of digital images based on one or more criteria, wherein the one or more criteria comprises at least one of:
relevance of each of the semantic categories;
consistency with human based classification; or
accuracy of each of the semantic categories; and
automatically rank the plurality of sets of semantic categories based on said analyzing.

34. The system of claim 23, wherein the digital image is comprised in the plurality of digital images, wherein the program instructions are further executable to:
determine information content of a plurality of semantic categories with respect to the plurality of digital images; and
automatically determine a subset of the plurality of semantic categories based on the determined information content, wherein each of the subset of the plurality of semantic categories is operable to partition the plurality of digital images.

35. A computer-implemented method, comprising:
executing instructions on a specific apparatus to perform determining a plurality of semantic category scores for a digital image via application of a corresponding plurality of classifiers, wherein the application of the plurality of classifiers is performed via multiple devices operating in conjunction over a network;
executing instructions on said specific apparatus to perform automatically determining a semantic category profile for the image based on the plurality of semantic category scores, wherein the semantic category profile characterizes semantic content of the image, and is useable to perform semantic based operations with respect to the image.

* * * * *

UNITED STATES PATENT AND TRADEMARK OFFICE
CERTIFICATE OF CORRECTION

PATENT NO. : 8,391,618 B1
APPLICATION NO. : 12/324328
DATED : March 5, 2013
INVENTOR(S) : Jason C. Chuang et al.

Page 1 of 1

It is certified that error appears in the above-identified patent and that said Letters Patent is hereby corrected as shown below:

In the Claims:

Column 16, Line 54, insert -- , -- between "...based operation" and "wherein the...", therefor.

Signed and Sealed this
Twenty-ninth Day of October, 2013

Teresa Stanek Rea
*Deputy Director of the United States Patent and Trademark Office*